(12) United States Patent
Grosdidier et al.

(10) Patent No.: US 7,072,297 B2
(45) Date of Patent: Jul. 4, 2006

(54) METHOD FOR DYNAMICAL IDENTIFICATION OF NETWORK CONGESTION CHARACTERISTICS

(75) Inventors: Gilbert Grosdidier, Gif-sur-Yvette (FR); Han C. Wen, San Jose, CA (US); Ian Adam, San Mateo, CA (US); Minh Duong-van, Menlo Park, CA (US); Thomas J. Pavel, San Jose, CA (US); Richard Blankenbecler, Stanford, CA (US)

(73) Assignee: Networks Physics, Inc., Mountain View, CA (US)

( * ) Notice: Subject to any disclaimer, the term of this patent is extended or adjusted under 35 U.S.C. 154(b) by 795 days.

(21) Appl. No.: 09/846,450

(22) Filed: Apr. 30, 2001

(65) Prior Publication Data
US 2002/0159386 A1  Oct. 31, 2002

(51) Int. Cl.
*H04L 12/28* (2006.01)
*G01R 31/08* (2006.01)

(52) U.S. Cl. .................. 370/231; 370/235; 370/253; 709/235

(58) Field of Classification Search .............. 370/229, 370/230, 231, 235, 235.1, 252, 253, 389, 370/395.1, 395.2, 395.21, 412, 428, 429; 709/232, 234, 235, 238; 710/29, 52, 56
See application file for complete search history.

(56) References Cited

U.S. PATENT DOCUMENTS

| | | | |
|---|---|---|---|
| 5,367,523 A | 11/1994 | Chang et al. | |
| 5,400,329 A | 3/1995 | Tokura et al. | |
| 5,426,640 A * | 6/1995 | Hluchyj et al. | 370/235 |
| 5,439,483 A | 8/1995 | Duong-Van | |
| 5,583,792 A * | 12/1996 | Li et al. | 709/224 |
| 5,646,943 A | 7/1997 | Elwalid | |
| 5,751,969 A | 5/1998 | Kapoor | |
| 5,930,364 A | 7/1999 | Kim | |
| 5,995,488 A | 11/1999 | Kalkunte et al. | |
| 6,014,694 A | 1/2000 | Aharoni et al. | |
| 6,046,988 A * | 4/2000 | Schenkel et al. | 370/254 |
| 6,075,770 A * | 6/2000 | Chang et al. | 370/395.21 |
| 6,201,791 B1 | 3/2001 | Bournas | |
| 6,219,713 B1 | 4/2001 | Ruutu et al. | |

(Continued)

FOREIGN PATENT DOCUMENTS

EP   0 817 433 A2   1/1998

(Continued)

OTHER PUBLICATIONS

U.S. Appl. No. 2003-0193893, filed Oct. 16, 2003, Wen et al.

(Continued)

*Primary Examiner*—Alpus H. Hsu
(74) *Attorney, Agent, or Firm*—Blakely, Sokoloff, Taylor & Zafman LLP (57) ABSTRACT

Congestion within a traffic stream of interest in a communication network is characterized as self-induced congestion or cross-induced congestion by analyzing a correlation result of a time series of throughput data of the traffic stream of interest and making the characterization based on power spectrum features found in the correlation result. The correlation result may be obtained through a Fourier analysis, a wavelet analysis or any mathematical process based on locating periodicities in the time series. In some cases, the characterization is made at a node in the communication network that is downstream from the congestion, while in other cases, the characterization is made at a node in the communication network that is upstream of the congestion.

26 Claims, 5 Drawing Sheets

U.S. PATENT DOCUMENTS

| | | | |
|---|---|---|---|
| 6,249,530 B1 | 6/2001 | Blanco et al. | |
| 6,477,143 B1 | 11/2002 | Ginossar | |
| 6,560,231 B1 | 5/2003 | Kawakami et al. | |
| 6,584,111 B1 | 6/2003 | Aweya et al. | |
| 6,600,721 B1 | 7/2003 | Edholm | |
| 6,614,763 B1 | 9/2003 | Kikuchi et al. | |
| 6,643,259 B1 | 11/2003 | Borella et al. | |
| 6,674,717 B1 | 1/2004 | Duong-van et al. | |
| 6,684,247 B1 | 1/2004 | Santos et al. | |
| 6,757,255 B1 | 6/2004 | Aoki et al. | |
| 6,766,309 B1 | 7/2004 | Cheng et al. | |
| 6,826,151 B1 * | 11/2004 | Li et al. | 370/230.1 |
| 2001/0015956 A1 | 8/2001 | Ono | |
| 2001/0032269 A1 * | 10/2001 | Wilson | 709/235 |
| 2002/0118649 A1 | 8/2002 | Farley et al. | |
| 2002/0118661 A1 * | 8/2002 | Voce | 370/337 |
| 2002/0159386 A1 | 10/2002 | Grosdidier et al. | |

FOREIGN PATENT DOCUMENTS

| | | |
|---|---|---|
| WO | WO 00/02356 A | 1/2000 |
| WO | WO 01/76160 A1 | 10/2001 |

OTHER PUBLICATIONS

John Nagle, "On Packet Switches with Infinite Storage," Network Working Group, Internet Engineering Task Force, RFC 970 (1985).

Van Jacobson and Michael J. Karels, "Congestion Avoidance and Control," Proceedings of SIGCOMM '88, ACM, Stanford, CA (Aug. 1988).

John P. Pippas, et al., "Shaping Aggregate LAN Flows for Transmission over ABR Connections," XP-000830899, Communication Networks, vol. 10, No. 1, pp. 45-56 (Jan. 1999).

Nguyen C. Trinh, et al., "Dynamic Resource Allocation for Self-Similar Traffic in ATM Network," XP-002169395, Proceedings APCC/OECC '99, pp. 160-165 (Oct. 18-22, 1999).

W. Richard Stevens, "TCP/IP Illustrated, vol. 1: The Protocols,"Addison-Wesley Publishing Company, pp. iii-xiv and 275-322 (1994).

Gary R. Wright and W. Richard Stevens, "TCP/IP Illustrated, vol. 2: The Implementation," Addison-Wesley Publishing Company, pp. vi-xviii and 817-1005 (1995).

* cited by examiner

METHOD FOR DYNAMICAL IDENTIFICATION OF NETWORK CONGESTION CHARACTERISTICS

FIELD OF THE INVENTION

The present invention relates to a scheme for identifying the presence or absence of congestion in the network and categorizing such congestion, when present.

BACKGROUND

Many communication networks, such as the Internet, rely on packet switching technologies (e.g., X.25, frame relay, asynchronous transfer mode, etc.) to transport variable or uniform blocks (usually termed packets or cells) of data between nodes. The term packet will be used herein to collectively refer to any such block of information. Such networks generally perform two major functions: routing and congestion control. The object of routing is to deliver, correctly and sometimes in sequence, the packets from a source to a destination. The object of congestion control is to maintain the number of packets within the network (or a region or sub-network thereof) below a level at which queuing delays become excessive. Due to finite resources, packets may be dropped rather than queued.

In essence, a packet switched network is a network of queues communicatively coupled together by communication links (which may be made up of various physical media). At each network node (e.g., a switch or router), there exist one or more queues of packets for each outgoing link. If the rate at which packets arrive and queue up exceeds the rate at which packets are transmitted, queue size grows without bound and the delay experienced by a packet tends towards infinity. In such situations, the network is said to be congested.

In an ideal case, network throughput, and hence network use, should increase to an offered load up to the physical capacity of the network and remain at capacity if the load is further increased. This ideal case, however, requires that all nodes somehow know the timing and rate of packets that will be presented to the network with no overload and no delay in acquiring this information; a situation which is not possible. If no congestion control is exercised, as the load increases, use increases for a while. Then, as the queue lengths at various nodes begin to grow, throughput actually drops. This is due to the fact that the queues are constrained to a finite length by the physical size of the memories in which they exist. When a node's memory (i.e., its queues) is full, it must drop (i.e., discard) additional incoming packets. Thus, the source is forced to retransmit these packets in addition to any new packets it might have. This only serves to worsen the situation. As more and more packets are retransmitted, the load on the network grows and more and more nodes become saturated. Eventually, even a successfully delivered packet may be retransmitted because it takes so long to get to its destination (whereupon it may be acknowledged by the destination node) that the source actually assumes that the packet was lost and tries to retransmit it. Under such circumstances, the effective capacity of the network can be virtually zero.

Contrary to what one might believe, the solution to this problem is not simply to allow the queue lengths to grow indefinitely. Indeed, it has been shown that even where queue lengths are allowed to be infinite, congestion can occur. See, e.g., John Nagle, "On Packet Switches with Infinite Storage", Network Working Group, Internet Engineering Task Force, RFC 970 (1985). One reason that this is true is that packets are often coded with an upper bound on their life, thus causing expired packets to be dropped and retransmitted, adding to the already overwhelming volume of traffic within the network.

Very early in the development of the modem Internet, it was discovered that some control over the manner in which packets were injected into the network by the source was needed to help with the problem of dropped packets. Originally, the well-known transmission control protocol (TCP) allowed a source to inject multiple packets into a network, up to a limit corresponding to a window or buffer size advertised by the receiver. Although such a scheme may work where the source and the receiver are connected to the same local area network, it was soon found that where routers having finite buffer sizes are disposed between the source and the receiver, problems arise as these routers soon run out of space to hold the incoming packets. To combat this problem Jacobson and Karels developed a "slow start" procedure wherein the source limits the rate at which it injects new packets into the network according to the rate at which acknowledgements of successful receptions are returned by the receiver. Van Jacobson and Michael J. Karels, "Congestion Avoidance and Control", Proceedings of SIGCOMM '88 (Stanford, Calif., August 1988), ACM.

Under the slow start procedure, a so-called congestion window is added to the source's TCP implementation. When a connection is established with a resource on another network, this congestion window is initialized to one segment (e.g., the segment or packet size advertised by the resource or a default packet size). Each time an acknowledgement is received, the congestion window is incremented and the source is allowed to inject a number of packets up to the minimum of the current congestion window size or the receiver's advertised window. Over time, the source's congestion window will grow exponentially until at some point the capacity of the intervening network is reached and some intermediate router begins dropping packets. This is an indication to the source that its congestion window has gotten too large. See, e.g., W. Richard Stevens, TCP/IP Illustrated, Vol. 1: The Protocols (1994) and Gary W. Wright and W. Richard Stevens, TCP/IP Illustrated, Vol. 2: The Implementation (1995).

At this point, and where the slow start process is run in concert with a conventional congestion avoidance procedure, the source resets its congestion window to one, and the process repeats up to the point at which the congestion window becomes half the size at which packet loss occurred previously. After this point, the congestion avoidance process takes over and begins incrementing the congestion window in a linear fashion (rather than in an exponential fashion as under the slow start process) in response to receiver acknowledgements.

Even with the slow-start process, however, congestion occurs within packet switched networks. Some of the present applicants have proposed certain congestion control methods in a number of co-pending patent applications. For example, in co-pending application Ser. No. 09/846,452, entitled "METHOD FOR ACCELERATING TCP FLOWS IN COMMUNICATION NETWORKS WITH DYNAMIC CONTROL", filed Apr. 30, 2001, and assigned to the assignee of the present application, a scheme for controlling congestion wherein predictions of congestion conditions for a traffic stream in a communication network are applied to modify an initial congestion window size for the traffic stream; and dynamic bandwidth control is thereafter applied to the traffic stream was proposed. In one embodiment (which itself was based on a congestion control technique described in co-pending application Ser. No. 09/539,434, entitled "METHOD FOR REDUCING PACKET LOSS AND INCREASING INTERNET FLOW BY FEEDBACK CONTROL," filed Mar. 30, 2000, now U.S. Pat. No. 6,674,717, and assigned to the assignee of the present application) this dynamic bandwidth control included modulating interpacket bandwidths of the traffic stream according to a capacity of a bottleneck in a communication path through which the traffic stream passes in the communication network. The predictions of congestion conditions may be based on monitoring packet losses within the communication network. The monitoring may be performed on at least one of a traffic stream-by traffic stream basis, a connection-by-connection basis, a link-by-link basis, or a destination-by-destination basis. Further, the monitoring may performed for a period between 0 and 100 seconds.

In some cases, the control techniques discussed in these co-pending applications, as well as other congestion control techniques developed by the present applicants, proved even better performance when the type of congestion being experienced can be determined. It is the procedures for making such determinations that are the subject of this application.

SUMMARY OF THE INVENTION

In one embodiment, congestion within a traffic stream of interest in a communication network is characterized as self-induced congestion or cross-induced congestion by analyzing a correlation result of a time series of throughput data of the traffic stream of interest and making the characterization based on power spectrum features found in the correlation result. The correlation result may be obtained through a Fourier analysis, a wavelet analysis or any mathematical process based on locating periodicities in the time series. In some cases, the characterization is made at a node in the communication network that is downstream from the congestion, while in other cases the characterization is made at a node in the communication network that is upstream of the congestion.

The power spectrum features may include one or more of a distinctive peak within the power spectrum and area content of the power spectrum at low frequencies. The congestion is characterized as self-induced when the power spectrum exhibits one or more well-defined peaks and little energy at low frequencies. Alternatively, the congestion is characterized as cross-induced when the power spectrum does not exhibit well-defined peaks and has relatively high power at low frequencies.

In another embodiment, a communication network includes one or more nodes at which traffic streams are buffered and at least one monitor node coupled in a communication path with one of the nodes at which traffic streams are buffered. The monitor node is configured to take a sample of throughput data for a traffic stream of interest, to compute a correlation result for the sample, and to determine whether congestion exists along the communication path of the traffic stream of interest according to whether or not certain features are found in the correlation result. The correlation result may be obtained through a Fourier analysis, a wavelet analysis or any mathematical process based on locating periodicities in the time series.

Preferably, the monitor node is configured to determine that self-induced congestion exists along the communication path of the traffic stream of interest if the correlation result exhibits one or more well-defined peaks and little power at low frequencies in the face of packet loss within the traffic stream of interest and to determine that cross-induced congestion exists along the communication path of the traffic stream of interest if the correlation result exhibits one or more not well-defined peaks and relatively high power at low frequencies in the face of packet loss within the traffic stream of interest. The monitor node may be further configured to implement a congestion control process according to whether or not cross-induced congestion or self-induced congestion is found in the communication path of the traffic stream of interest. Alternatively, a control node may be configured to implement the congestion control process according to whether or not cross-induced congestion or self-induced congestion is found in the communication path of the traffic stream of interest.

In yet another embodiment, a sample of throughput data for a traffic stream of interest in a communication network is analyzed to produce a power spectrum of the sample and the power spectrum is compared to stored replicas of power spectrums of known congestion sources within the communication network to determine a source of congestion (e.g., a bottleneck) for the traffic stream of interest. In some cases, peaks of the power spectrum of the sample are compared to peaks of the stored replicas of the power spectrums of the known congestion sources. Further, a congestion control process may be applied to the traffic stream of interest based on results of the comparison. The location of these peaks in the Fourier power spectrum may reveal the bottleneck capacity as follows:

Bottleneck bandwidth=(packet size)/(period), where the period is the inverse of the frequency of the peak as determined from the Fourier power spectrum.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A scheme for categorizing congestion in a computer or communication network, such as the Internet or other packet switched network, is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope. It should also be noted that as used herein the term "packet" is meant to broadly refer to packets, cells and other forms of information units used to transport data and/or control information within communications infrastructures (e.g., computer networks, telecommunications networks, data communication networks and the like, for example, the Internet) wherein resources are shared among multiple users and multiple information or traffic streams.

Existing congestion control approaches have generally viewed network traffic (e.g., the generation of new packets to be injected into a network) as essentially random processes. However, recent work in the area of traffic modeling has shown that network traffic is in fact chaotic in nature. None of the currently proposed congestion control methodologies capture or exploit this characteristic.

Figure 1:
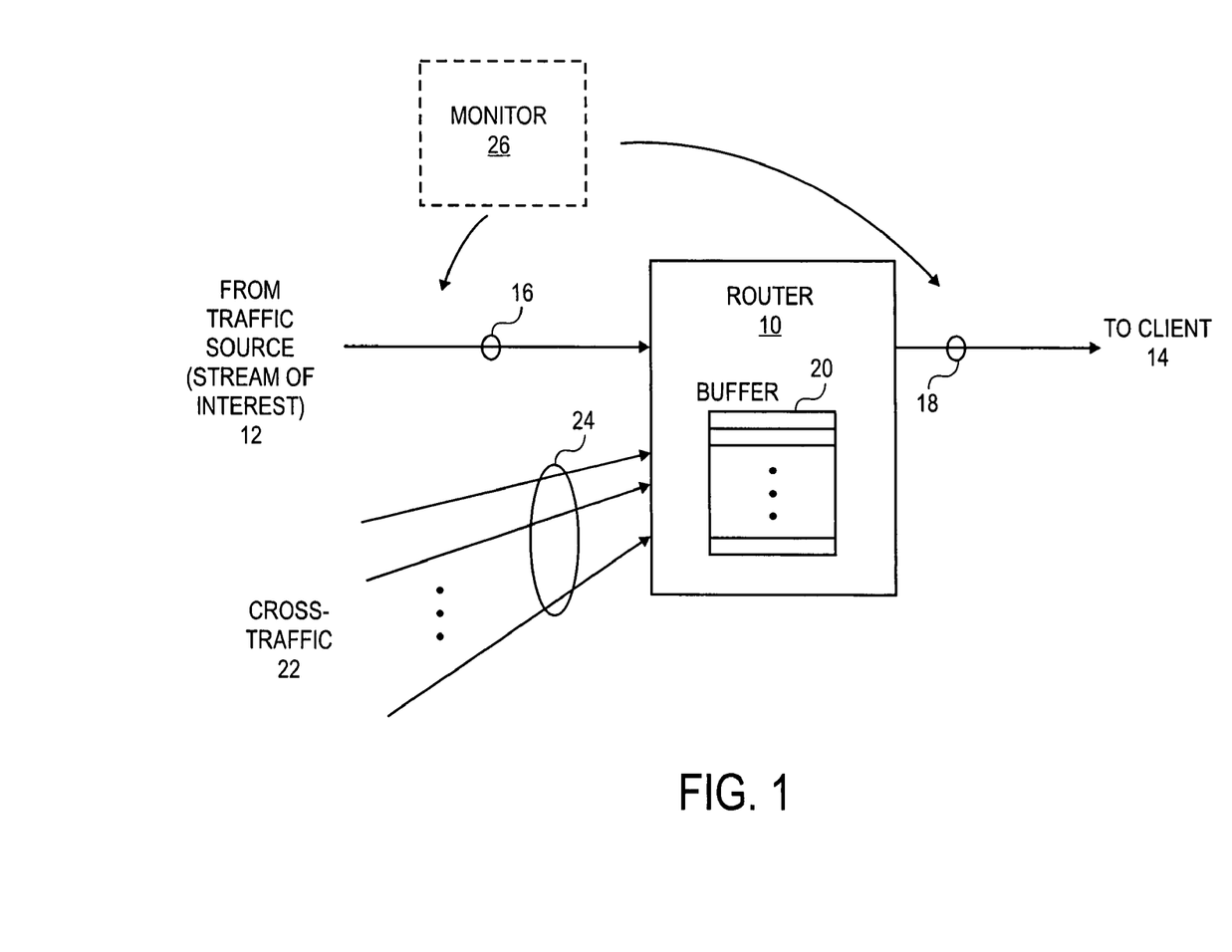
FIG. 1 shows an example of a congested router in a communication network as well as a monitor node which can be used to categorize the type of congestion being experienced in accordance with an embodiment of the present invention.

Sources of congestion within a network can be understood with reference to FIG. 1. Shown in this illustration is a router (or other network node, such as a switch, bridge, etc.) 10 which is connected in a communication path between a traffic source of interest 12 and a client 14. This connection exists through communication links 16 and 18, which generally will not have equal bandwidths. That is, some bandwidth mismatch will often occur at nodes such as router 10. Often the communication link coupling the network node to the content source (i.e., link 16 in this example) will have a greater bandwidth than the communication link coupling the node to a client (i.e., link 18 in this example).

Whenever a bandwidth mismatch of this type occurs, some packet buffering will be required. Hence, router 10 in equipped with one or more buffers 20, which are configured to store packets received from the traffic source until they can be transmitted on to the client 14. These transmissions usually occur at some periodic interval, usually defined by a scheduler in router 10 (not shown). The scheduler allows packet transmissions to take place depending upon the bandwidth of the outgoing communication link, customer subscription agreements and/or other network conditions.

In addition to the traffic of interest, router 10 may also be in the communication path for one or more other traffic streams, some of which may be bound for client 14 and others of which may be bound for other nodes in or coupled to the network. This cross-traffic 22 may exist on one or more communication links 24 and may also involve packets being buffered at router 10 for some period of time.

As discussed above, congestion will occur at router 10 when buffer 20 (and assume for the moment that this buffer represents all available buffers at router 10) is full and new packets arrive before old packets can be transmitted out of the buffer. In such a case, packets will be dropped. This situation may occur for either of two reasons. First, in cases where there is little or no cross-traffic, or stated differently, where all of the traffic seen by buffer 20 is traffic of interest, then the packets that are dropped will be packets of the traffic stream(s) of interest. This is referred to herein as "self-induced congestion". That is, the congestion results primarily (or solely) as a result of traffic from the streams of interest.

The second situation involves cases where there would be no congestion but for the presence of cross-traffic 22. That is, the buffer overflows (and subsequent packet drops) are a result of heavy cross-traffic. Not only are packets from this cross-traffic dropped, but so too are packets from the traffic stream(s) of interest 12 dropped (because all packets must use the same buffer(s) 20. This situation is referred to a "cross-induced congestion" to point out the fact that it is (primarily) due to cross-traffic 22.

The present invention provides a mechanism to distinguish between situations when congestion is self-induced form when it is cross-induced. Stated briefly, by analyzing a time series of the throughput data of the traffic stream(s) of interest (preferably at very fine time scales), and then applying a Fourier (or other periodic, e.g., wavelet) analysis, the present applicants have found that congestion "signatures" can be observed and these signatures are different for the case of self-induced congestion than for cross-induced congestion. As shown in FIG. 1, the analysis can be performed at a monitor node 26, which is located either upstream of downstream of the congested router 10.

Stated differently, for a given congested network route, the underlying mechanisms that characterize the congestion can be identified by a time series analysis of one or more streams that are transferring files along that network route. In particular, a Fourier transform of the time series of the throughput (number of packets transferred per time period) of these streams, reveals a signature that identifies the type of congestion occurring along that specified network route. Other analyses that a Fourier transform may be performed, for example a wavelet transform may be used or any other transform that reveals periodicity in a time series of data.

An analysis of the time series of the streams monitored traversing a congested route can reveal the characteristics of the congestion. Fourier transforming the time series of throughput results in a Fourier power spectrum that exhibits strongly identifiable differences between congestion that is self-induced versus cross-induced. If the congestion is self-induced, the power spectrum shows strong peaks at frequencies associated with each link where significant bandwidth mismatches occur. If the congestion is cross-induced, the aforementioned peaks are suppressed in amplitude while broad peaks at much lower frequencies emerge. The power spectrum for congestion that is cross-induced is generally flatter than for congestion that is self-induced, where the latter shows suppression of Fourier power at the lower frequencies.

Figure 2:
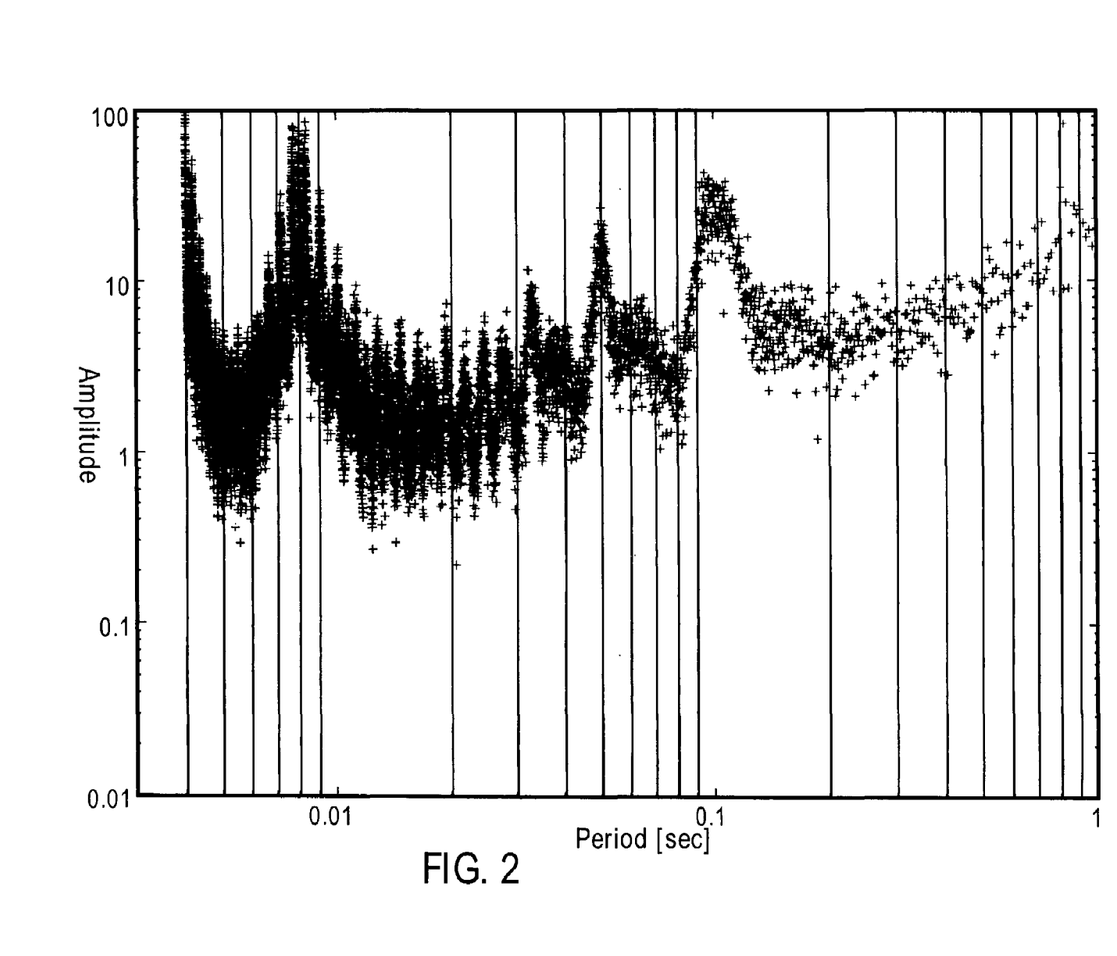
FIG. 2 shows a plot of a Fourier power spectrum of a traffic stream in an uncongested network.

Two underlying mechanisms determine the characteristics of the time series of streams with a common network route. 1) The end-to-end dynamics generated by the file-size distribution, the client "think-time" distribution, the round trip times and the aggregation of multiple simultaneous streams. All of these factors result in a rich array of resonances, which translates into a (Type A) power spectrum of multiple peaks, with various harmonics of differing heights and widths. Such a spectrum is illustrated in the plot of FIG. 2. 2) The local dynamics generated by the queuing discipline performed by the routers along the route where congestion occurs. Congestion is a product of both bandwidth mismatch and load. When the queue fills, the dynamics of packets scheduled to leave reduces to a relatively simple "leaky-bucket" scenario; a single rate, that of the congested link, of one packet every MTU/BW. MTU is the maximum transmission unit and BW is the physical bandwidth of the congested link. This translates into a "leaky-bucket" peak in the Fourier spectrum for each bandwidth mismatch at frequencies corresponding to 1/("leaky bucket" rate)=MTU/BW. The location of these peaks in the Fourier power spectrum may reveal the bottleneck capacity as follows:

Bottleneck bandwidth=(packet size)/(period), where the period is the inverse of the frequency of the peak as determined from the Fourier power spectrum.

If the queue is continuously saturated due to heavy loads, the "leaky-bucket" dynamics filters out much of the time variability introduced by the end-to-end dynamics. This translates into a power spectrum that in contrast to Type A, has most of the finer peaks washed out, while having the "leaky bucket" peaks enhanced (Type B, see FIG. 3) if the congestion is self-induced congestion or suppressed (Type C, see FIG. 4) if the congestion is cross-induced.

The presence of cross-induced congestion imposes a different aspect of local dynamics on the monitored streams than that of self-induced congestion. When there is cross-induced congestion, the "leaky bucket" dynamics of the cross-traffic drives not only its own traffic, but also the monitored streams traffic, albeit at a muted level. The cross-traffic also induces low frequency oscillations in the monitored streams traffic that are not present in the cross-traffic's own power spectrum.

Given the two mechanisms of end-to-end and local dynamics as described above, the implications for identifying the congestion type become straightforward. If there is congestion with significant packet loss and the power spectrum exhibits strong peaks at high frequencies with relatively little power at low frequencies, then the congestion is self-induced by the monitored streams. If instead, the power spectrum is relatively flat with power and broad resonances at both high and low frequencies, then the congestion is induced by cross-traffic through one or more router nodes along the route.

Figure 5:
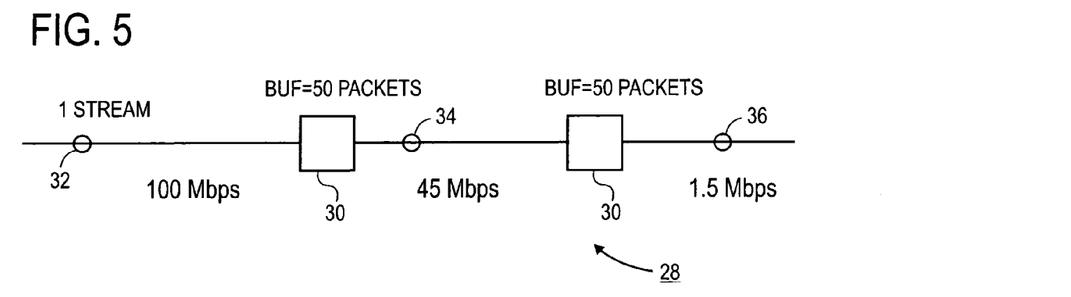
FIG. 5 shows the network for which the plot of FIG. 2 was obtained.

FIG. 2 shows an example of a Fourier power spectrum plotted versus 1/frequency (i.e., period) that is predominately Type A (rich spectrum of peaks at all frequencies) with some evidence of Type B congestion (peaks at frequencies corresponding to the 45 Mbps to 1.5 Mbps bandwidth mismatch (~8 ms) and the 100 Mbps to 45 Mbps bandwidth mismatch (<2 ms)). Packet Loss is less than 1 percent. FIG. 5 illustrates the network 28 for which this plot was obtained. The buffer size (Buf) for each node 30 (which may be a router, for example) is shown, as are the bandwidths for the communication links 32, 34 and 36.

Figure 3:
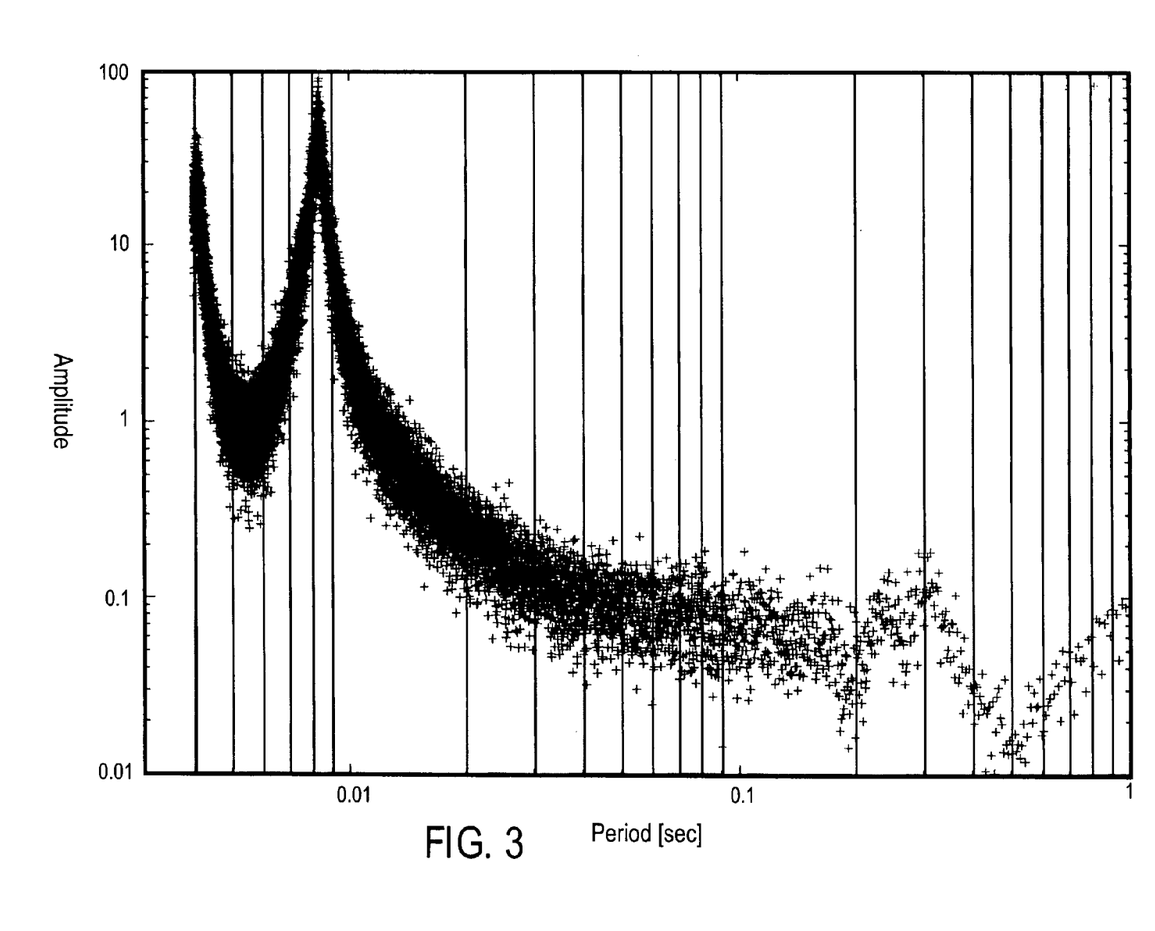
FIG. 3 shows a plot of a Fourier power spectrum of a traffic stream in a network experiencing self-induced congestion.
Figure 6:
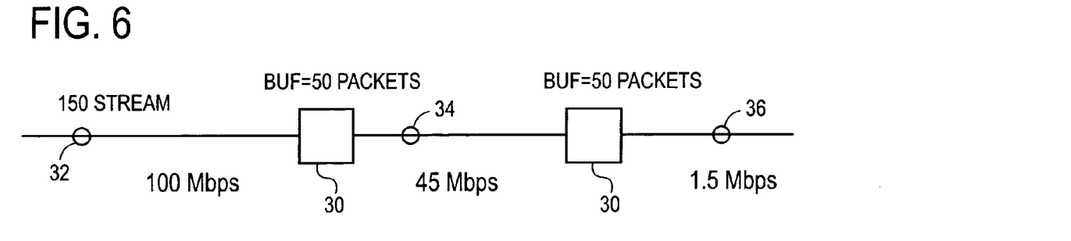
FIG. 6 shows the network for which the plot of FIG. 3 was obtained.

FIG. 3 shows an example of a Fourier power spectrum plotted versus 1/frequency=period that is purely Type B congestion. Notice the strong peaks at the bandwidth mismatches and the suppression of power at large periods. Packet loss is approximately 13 percent. In this example, the strong peak occurs at a period of approximately 8 msec. This corresponds to the bottleneck bandwidth of 1.5 Mbits/sec (assuming a packet size of 1500 bytes) (BW=packet size/period=1500 bytes/8 msec~1.5 Mbits/sec). FIG. 6 illustrates the conditions for network 28 for which this plot was obtained.

Figure 4:
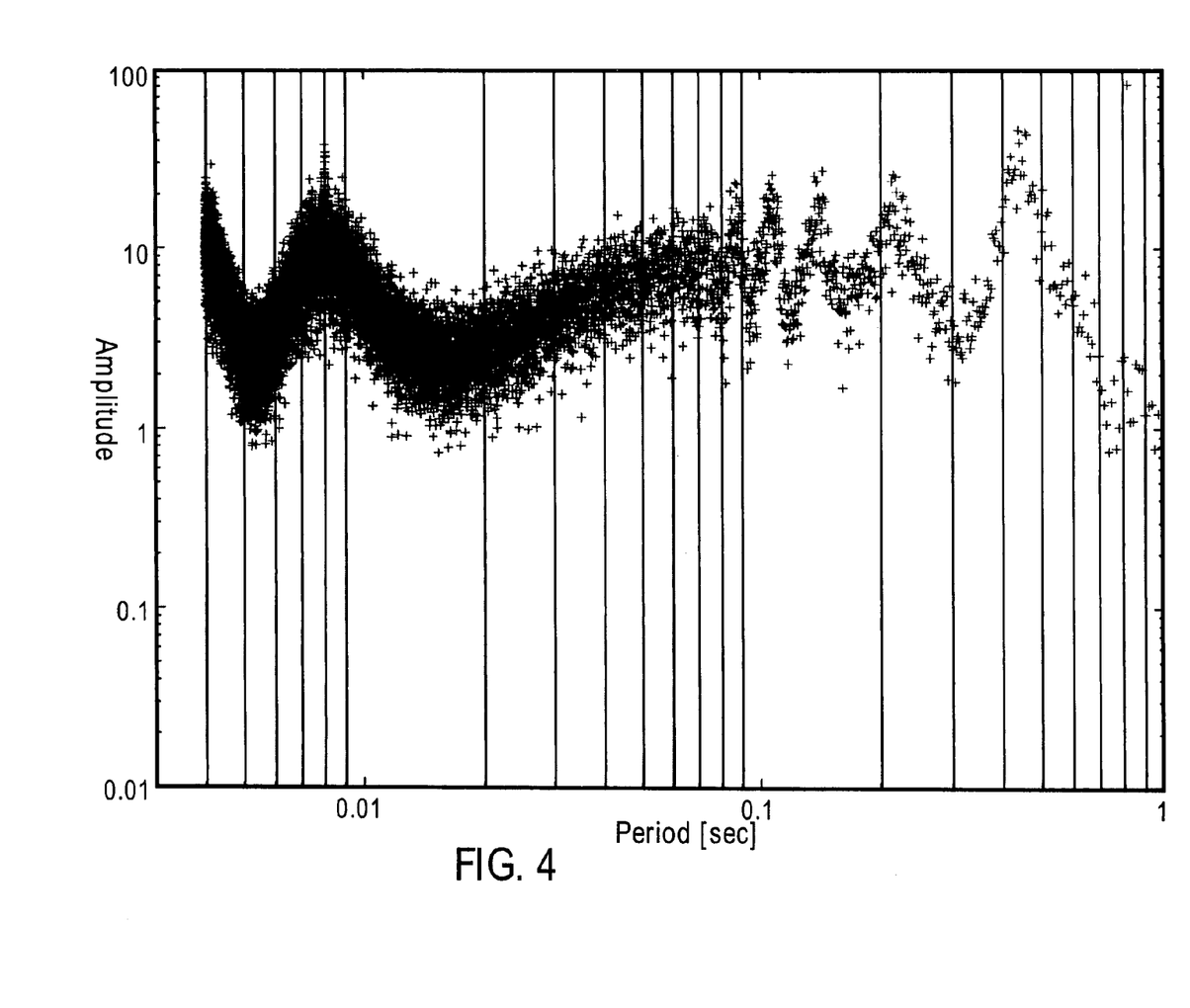
FIG. 4 shows a plot of a Fourier power spectrum of a traffic stream in a network experiencing cross-induced congestion.
Figure 7:
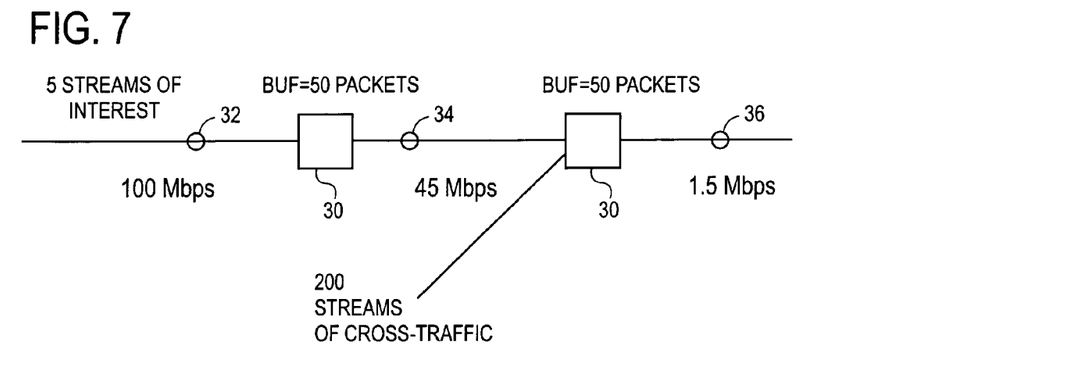
FIG. 7 shows the network for which the plot of FIG. 4 was obtained.

FIG. 4 shows an example of a Fourier power spectrum plotted versus 1/frequency=period that is purely Type C congestion. Notice the relatively flat spectrum with suppressed peaks at the bandwidth mismatches and emergence of broad peaks at large periods. Packet loss is approximately 15 percent. FIG. 7 illustrates the conditions for network 28 for which this plot was obtained.

As discussed above, the monitoring process can be performed upstream or downstream of the congestion. In either case, the monitor node 26 (see FIG. 1), which may also be used as a control node when configured to implement a congestion control process, may be configured to collect a data sample of the monitored stream (say, for example, between 20 seconds and one minute worth of data) and then perform a Fast Fourier Transform (FFT) to obtain the power spectrum of that data. Any resulting peaks in the power spectrum can be determined (for example, by measuring their amplitude with respect to the mean) and if the peaks are well defined (say, by a measure of their sharpness in amplitude over the one-half power point or other convenient measure) and a statistically significant amount of packet loss is being experienced, this may be taken as a sign that the congestion is self-induced. If no well-defined peaks are founds, but the data shows that there is a statistically significant amount of packet loss, this may be taken as an indication that the congestion is cross-induced.

Thus a scheme for categorizing congestion in a communication network has been described. This process may be used to determine which, if any, congestion control techniques should be applied in a network. For example, in one embodiment, the control technique described in the above-cited co-pending patent application, application Ser. No. 09/539,434, which is hereby incorporated by reference in its entirety, may be used. Under the scheme described in the co-pending patent application, the end-to-end packet losses of one or more traffic streams transmitted across a congested network may be reduced by modulating the bandwidths (i.e., the inter-packet delay) of the corresponding traffic streams applied to the node(s) of the network from one or more control points along the network topology. This reduction in packet loss results in a reduction in fluctuations or variability of the controlled traffic streams, an increase in bandwidth utilization of a congested link at downstream points and a reduction in times to transmit files (e.g., to an end-user). The control points can be either upstream or downstream of one or more congestion points along the network.

By modulating the bandwidth of the traffic streams, feedback to the packet origin points (e.g., origin servers) congestion avoidance processes or algorithms is provided via acknowledgement delays from the ultimate client. That is, the time at which such acknowledgements are received at these servers is increased. This feedback indirectly (i.e., through existing congestion avoidance processes present in packet networks) controls the rate at which the server transmits new packets into the network in such a way that overall packet loss is minimized.

Thus, this scheme introduces feedback control upstream or downstream of a congested node (such as a router or switch) to reduce packet loss and thereby smooth traffic flow and provide for increased throughput through that node (and even other downstream nodes). The feedback may be applied using a separate control node upstream or downstream of the congested node, or the feedback mechanisms may be integrated into existing network nodes. The feedback may be applied at frequencies (i.e., time intervals) that depend on the characteristics of the network traffic media (e.g., the bandwidth of the communication links). For example, the control bandwidth node (i.e., the inter-packet spacing for transmission from the control node) may be set at bandwidths that correspond to the peaks identified in the power spectrums of the sampled data. By applying such feedback control, the packet loss across multiple congested nodes is reduced, resulting in higher network throughput. Not only is throughput improved for the node immediately downstream of the point of feedback control, it may also be improved for subsequent downstream nodes.

One potential application of the above-described process may be "fingerprinting" sources of congestion in a network. It is possible that individual congestion sources will have unique FFT signatures (i.e., unique peaks at certain periods). Thus, when a connection or traffic stream experiences congestion, diagnostic equipment (e.g., at a monitor node, which could be added temporarily to a network) could be used to obtain a power spectrum of the stream and then the resulting spectrum could be analyzed against a database of known congestion sources much like the way human fingerprints are analyzed. A match in power spectrums could thereby yield the actual source (or sources) of congestion for the traffic stream of interest and corrective action taken accordingly. It should be remembered that although the foregoing description and accompanying figures discuss and illustrate specific embodiments, the broader scope of present invention should be measured only in terms of the claims that follow.

What is claimed is:

1. A method, comprising characterizing congestion within a traffic stream of interest in a communication network as self-induced congestion or cross-induced congestion by analyzing a correlation result of a time series of throughput data of the traffic stream of interest and making the characterization based on power spectrum features found in the correlation result.

2. The method of claim 1 wherein the correlation result is obtained through a Fourier analysis of the time series.

3. The method of claim 1 wherein the correlation result is obtained through a wavelet analysis of the time series.

4. The method of claim 1 wherein the correlation result is obtained through a mathematical process based on locating periodicities in the time series.

5. The method of claim 1 wherein the characterization is made at a node in the communication network that is downstream from the congestion.

6. The method of claim 1 wherein the characterization is made at a node in the communication network that is upstream of the congestion.

7. The method of claim 1 wherein the power spectrum features comprise one or more of a distinctive peak within the power spectrum and area content of the power spectrum at low frequencies.

8. The method of claim 7 wherein the congestion is characterized as self-induced when the power spectrum exhibits one or more well-defined peaks and little power at low frequencies.

9. The method of claim 7 wherein the congestion is characterized as cross-induced when the power spectrum does not exhibit well-defined peaks and has relatively high power at low frequencies.

10. A communication network, comprising:
   one or more nodes at which traffic streams are buffered; and
   at least one monitor node coupled in a communication path with one of the nodes at which traffic streams are buffered, the monitor node configured to take a sample of throughput data for a traffic stream of interest, to compute a correlation result for the sample, and to determine whether cross-induced congestion or self-induced congestion is found in the communication path of the traffic stream of interest according to the correlation result.

11. The communication network of claim 10 wherein the correlation result is obtained through a Fourier analysis of the time series.

12. The communication network of claim 10 wherein the correlation result is obtained through a wavelet analysis of the time series.

13. The communication network of claim 10 wherein the correlation result is obtained through a mathematical process based on locating periodicities in the time series.

14. The communication network of claim 10 wherein the monitor node is configured to determine that self-induced congestion exists along the communication path of the traffic stream of interest if the correlation result exhibits one or more well-defined peaks and little power at low frequencies in the face of packet loss within the traffic stream of interest.

15. The communication network of claim 10 wherein the monitor node is configured to determine that cross-induced congestion exists along the communication path of the traffic stream of interest if the correlation result exhibits one or more not well-defined peaks and relatively high power at low frequencies in the face of packet loss within the traffic stream of interest.

16. The communication network of claim 10 wherein the monitor node is further configured to implement a congestion control process according to whether or not cross-induced congestion or self-induced congestion is found in the communication path of the traffic stream of interest.

17. The communication network of claim 10 further comprising a control node configured to implement a congestion control process according to whether or not cross-induced congestion or self-induced congestion is found in the communication path of the traffic stream of interest.

18. A method comprising analyzing a sample of throughput data for a traffic stream of interest in a communication network to produce a power spectrum of the sample and comparing the power spectrum to stored replicas of power spectrums of known congestion sources within the communication network to determine a source of congestion for the traffic stream of interest.

19. The method of claim 18 wherein peaks of the power spectrum of the sample are compared to peaks of the stored replicas of the power spectrums of the known congestion sources.

20. The method of claim 18 further comprising applying a congestion control process to the traffic stream of interest based on results of the comparison.

21. A method, comprising analyzing a sample of throughput data for a traffic stream of interest in a communication network to produce a power spectrum of the sample, the power spectrum having one or more peaks, and identifying bandwidth mismatch at nodes of the network according to definition of the peaks at different frequencies of the power spectrum.

22. The method of claim 21 wherein the analyzing is performed at a control node in the network and further comprising setting a control bandwidth of the control node according to the identified bandwidth mismatches at the nodes of the network.

23. The method of claim 22 wherein the analyzing comprises using a fast Fourier transform process.

24. The method of claim 22 wherein the analyzing comprises using a wavelet transform process.

25. The method of claim 22 wherein the analyzing comprises using a process that reveals periodicities in a time series.

26. The method of claim 21 wherein periodicity of the peaks correspond to bandwidths of bottlenecks within the network.

* * * * *